United States Patent
Yano

(10) Patent No.: US 11,420,574 B2
(45) Date of Patent: Aug. 23, 2022

(54) STEERING SWITCH

(71) Applicant: Nissan Motor Co., Ltd., Yokohama (JP)

(72) Inventor: Takahiro Yano, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/610,642

(22) PCT Filed: May 15, 2019

(86) PCT No.: PCT/JP2019/019413
§ 371 (c)(1),
(2) Date: Nov. 11, 2021

(87) PCT Pub. No.: WO2020/230315
PCT Pub. Date: Nov. 19, 2020

(65) Prior Publication Data
US 2022/0212612 A1    Jul. 7, 2022

(51) Int. Cl.
*B60Q 1/34* (2006.01)
*B60R 16/027* (2006.01)
*B62D 15/02* (2006.01)
*B62D 1/04* (2006.01)

(52) U.S. Cl.
CPC .............. *B60R 16/027* (2013.01); *B62D 1/04* (2013.01); *B62D 15/025* (2013.01)

(58) Field of Classification Search
CPC ........ B60R 16/027; B62D 1/04; B62D 15/025
See application file for complete search history.

(56) References Cited

U.S. PATENT DOCUMENTS

| | | | |
|---|---|---|---|
| 5,739,491 A | 4/1998 | Crosson, Jr. | |
| 6,548,772 B2* | 4/2003 | Liburdi | B60K 37/06 200/61.54 |
| 6,961,644 B2* | 11/2005 | Mercier | B62D 1/046 345/184 |
| 11,124,236 B2 | 9/2021 | Harada | |
| 2015/0041299 A1 | 2/2015 | Suzuki et al. | |
| 2018/0257708 A1 | 9/2018 | Harada | |
| 2020/0189600 A1* | 6/2020 | Tsuji | B62D 5/046 |
| 2020/0255016 A1* | 8/2020 | Tsuji | B62D 15/025 |

FOREIGN PATENT DOCUMENTS

| | | |
|---|---|---|
| CN | 203595964 U | 5/2014 |
| CN | 108583572 A | 9/2018 |
| JP | 2005-96656 A | 4/2005 |
| JP | 2006-7918 A | 1/2006 |
| JP | 2013-151232 A | 8/2013 |
| JP | 2017-166913 A | 9/2017 |

* cited by examiner

*Primary Examiner* — Toan N Pham
(74) *Attorney, Agent, or Firm* — Young Basile Hanlon & MacFarlane, P.C.

(57) ABSTRACT

A steering switch is provided on a spoke of a steering wheel for steering a vehicle, and includes a main switch pressed to input an ON/OFF operation of a drive assistance system installed in the vehicle, and an approval switch pressed to input an approval of a lane change executed by the drive assistance system. The approval switch is arranged adjacent to the upper side of the main switch.

9 Claims, 5 Drawing Sheets

STEERING SWITCH

TECHNICAL FIELD

The present invention relates to steering switches arranged on spokes of a steering wheel for steering a vehicle.

BACKGROUND

Japanese Unexamined Patent Application Publication No. 2013-151232 discloses steering switches for switching control modes. The steering switches disclosed in Japanese Unexamined Patent Application Publication No. 2013-151232 include an operation button M1 for a normal mode and an operation button M3 for a power mode that makes a quick response to an acceleration operation, the operation buttons M1 and M3 being aligned laterally next to each other.

SUMMARY

However, in the conventional steering switches described above, since the operation button M1 for the normal mode and the operation button M3 for the power mode are arranged side by side, there is a problem that the two adjacent switches may be operated by mistake. In particular, when the switches are arranged adjacent to each other on the left and right, the distance from the position where the steering wheel is held to each switch is different. Therefore, it is difficult to judge the difference in the distance only with the fingertips. This arrangement of the two switches can cause a wrong operation of wrongly pressing the operation button M1 closer to the hand of the operator who intends to press the operation button M3 arranged closer to the center of the steering wheel.

In view of the foregoing problems, an object of the present invention is to provide a steering switch with an arrangement capable of reducing a probability of a wrong operation between two switches arranged adjacent to each other.

To deal with the problems described above, a steering switch according to an aspect of the present invention includes a main switch pressed to input an ON/OFF operation of a drive assistance system installed in a vehicle, and an approval switch pressed to input an approval of a lane change executed by the drive assistance system. The approval switch is arranged adjacent to an upper side of the main switch.

The present invention can reduce the probability of a wrong operation between the main switch and the approval switch arranged adjacent to each other.

DETAILED DESCRIPTION

Figure 1:
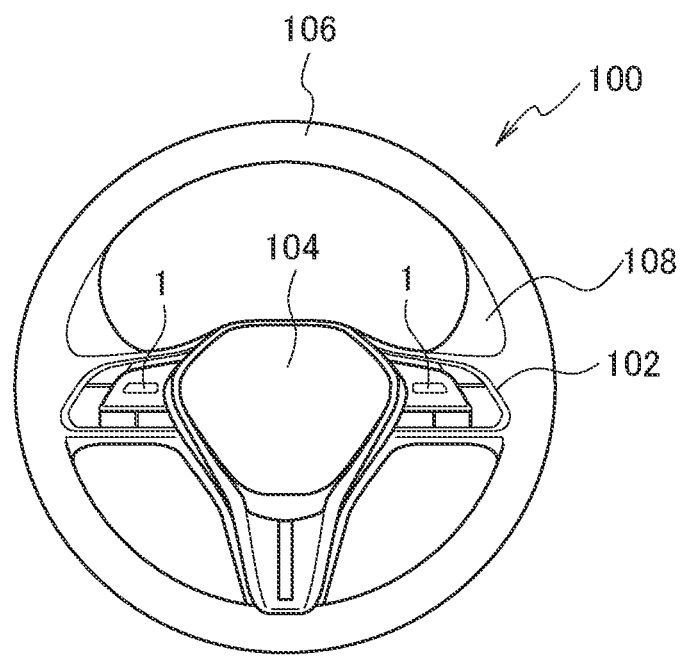
FIG. 1 is a diagram illustrating a structure of a steering wheel provided with steering switches according to an embodiment of the present invention.

An embodiment to which the present invention is applied is described below with reference to the drawings. The same elements illustrated in the drawings are denoted by the same reference numerals, and overlapping explanations are not repeated below.

[Structure of Steering Switch]

Figure 2:
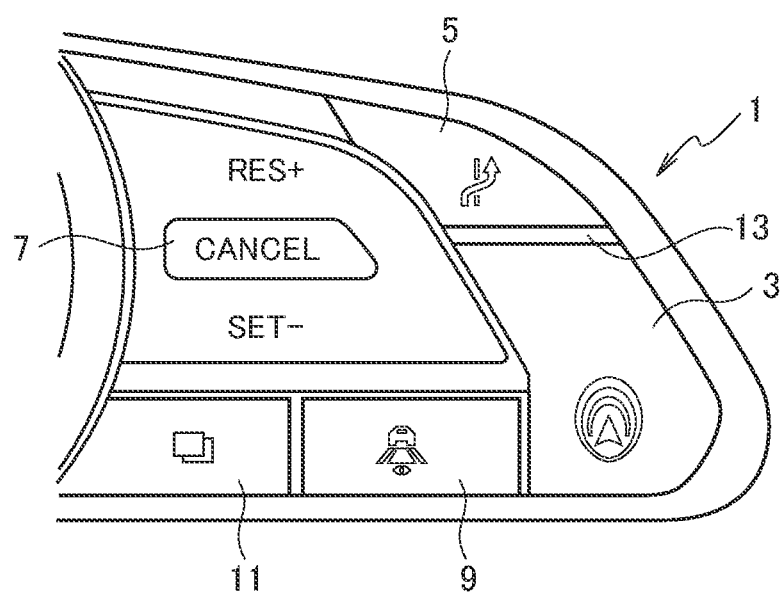
FIG. 2 is an enlarged diagram illustrating a structure of the steering switches according to the embodiment of the present invention.

FIG. 1 is a diagram illustrating a structure of a steering wheel equipped with steering switches according to the present embodiment, and FIG. 2 is an enlarged diagram illustrating structure of the steering switches. As illustrated in FIG. 1, and FIG. 2, the steering switches 1 according to the present embodiment are provided on spokes 102 of the steering wheel 100 for steering the vehicle.

The steering wheel 100 is composed of the spokes 102, a hub 104, and a rim 106. The steering wheel 100 includes the three spokes 102 to connect the hub 104 with the rim 106, and the steering switches 1 are arranged on the two spokes 102 on the right and left sides. The spokes 102 provided with the steering switches 1 are connected to the rim 106 around (below) reference positions at which the driver holds the rim 106 (at positions corresponding to ten past ten). The spokes 102 extend horizontally from the hub 104 to connect the hub 104 with the rim 106, as illustrated in FIG. 1. The rim 106 has a circular shape, and is held by the driver so as to rotate the steering wheel 100. The steering wheel 100 is further provided with support regions 108 between the respective spokes 102 and the rim 106 to support the grip of the driver when holding the rim 106 at the reference positions.

As illustrated in FIG. 2, one of the steering switches 1 includes a main switch 3, an approval switch 5, a cancellation switch 7, an inter-vehicle distance setting change switch 9, and a screen change switch 11. While the steering switches 1 include other switches, explanations thereof are omitted below. The present embodiment is illustrated with the case in which the main switch 3 and the approval switch 5 are arranged on the spoke 102 on the right side, but the main switch 3 and the approval switch 5 may be arranged on the spoke on the left side instead. The steering switch 1 has a shape with a width gradually increased in the diagonally downward direction toward the rim 106 so as to facilitate the operation of the respective switches by the driver with the thumb.

The main switch 3 is a switch for inputting an ON/OFF operation of the drive assistance system installed in the vehicle. Pressing the main switch 3 can start or finish the drive assistance. The main switch 3 is provided adjacent to the rim 106, and has a largest switch surface among the other switches included in the steering switch 1. Since the main switch 3 has a structure in which only the lower region of the switch surface can be pressed, the upper region of the switch surface cannot be pressed. The switch surface of the main switch 3 is provided with a mark indicative of the drive assistance, the mark indicates that the driver can start or finish the drive assistance by operating the main switch 3.

The approval switch 5 is a switch for inputting an approval of a lane change executed by the drive assistance system. The approval switch 5 is provided adjacent to the rim 106, and is arranged adjacent to the upper side of the main switch 3. However, it is possible to input the cancellation of the lane change executed by the drive assistance system by pressing the approval switch 5 for a predetermined period or longer (by a long press). The approval switch 5 has a structure in which the entire switch surface can be pressed. The switch surface of the approval switch 5 is provided with a mark indicative of the lane change, the mark indicates that the lane change is executed by the operation of the approval switch 5.

The cancellation switch 7 is a switch for canceling the control currently executed by the drive assistance system. The press of the cancellation switch 7 can also turn off the drive assistance system. The cancellation switch 7 has a structure protruding upward more than the switch surfaces of the other switches, so as to allow the driver to easily recognize the position only by the touch with the finger. The switch surface of the cancellation switch 7 is provided with the word "cancel" indicating that the control of the drive assistance system is canceled by the operation of the cancellation switch 7.

The inter-vehicle distance setting change switch 9 is a switch for setting and changing an inter-vehicle distance with a preceding vehicle when the drive assistance system detects the preceding vehicle. The press of the inter-vehicle distance setting change switch 9 can change the inter-vehicle distance to be longer or shorter. The inter-vehicle distance setting change switch 9 is arranged adjacent to the main switch 3 toward the hub 104. The switch surface of the inter-vehicle distance setting change switch 9 is provided with a mark indicative of an inter-vehicle distance, the mark indicates that the distance between the vehicles can be set or changed by the operation of the inter-vehicle distance setting change switch 9.

The screen change switch 11 is a switch for switching the indication of a head-up display or a meter display installed in the vehicle. The screen change switch 11 is arranged adjacent to the inter-vehicle distance setting change switch 9 toward the hub 104. The switch surface of the screen change switch 11 is provided with a mark indicative of a display screen, the mark indicates that the display screens can be switched by the operation of the screen change switch 11.

As illustrated in FIG. 1 and FIG. 2, the main switch 3 and the approval switch 5 are arranged at positions closest to the rim 106 among the plurality of switches included in the steering switch 1. The arrangement of the main switch 3 and the approval switch 5 closest to the position at which the driver holds the rim 106 enables the driver to operate the main switch 3 and the approval switch 5 most easily.

The main switch 3 and the approval switch 5 are each arranged within a range corresponding to an average length of thumbs of adult drivers from the rim 106. This arrangement allows the driver to operate the main switch 3 and the approval switch 5 only by moving the thumb without releasing the hand from the rim 106.

As illustrated in FIG. 2, the approval switch 5 is arranged adjacent to the upper side of the main switch 3. Since the driver holds the rim 106 with the thumb put on the spoke 102, the steering switch 1 is located below the reference position at which the driver holds the rim 106. The approval switch 5 is thus located at the position closest to the thumb of the driver when the driver tries to operate the steering switch 1 with the thumb.

The arrangement of the approval switch 5 at the position described above can reduce the probability of wrongly pressing the main switch 3 when the driver intends to operate the approval switch 5 in response to the approval request from the drive assistance system. Particularly, since the approval switch 5 is a switch that is operated in response to the request from the drive assistance system, the driver needs to operate the approval switch 5 not at any timing that the driver wants but at the timing when responding to the request from the drive assistance system. The driver, who intends to operate the approval switch 5, would have the probability of wrongly pressing any other switch located adjacent to the approval switch 5. The arrangement of the approval switch 5 according to the present embodiment, which is located at the position adjacent to the upper side of the main switch 3 and closest to the thumb of the driver, can reduce the probability of wrongly pressing the main switch 3.

The main switch 3 has the structure in which only the lower region of the switch surface can be pressed, and the approval switch 5 has the structure in which the entire switch surface can be pressed. Since the upper region of the main switch 3 adjacent to the approval switch 5 cannot be pressed, the probability of wrongly pressing the main switch 3 can be reduced when the driver intends to operate the approval switch 5.

In addition, the main switch 3 and the approval switch 5 are divided by a protruding member 13 interposed therebetween. The protruding member 13 protrudes upward more than the switch surface of the main switch 3 and the switch surface of the approval switch 5. The protruding member 13 allows the driver to recognize the boundary between the main switch 3 and the approval switch 5 with the finger, so as to reduce the probability of wrongly pressing the main switch 3 when the driver intends to operate the approval switch 5.

The main switch 3 has the wider switch surface than the approval switch 5. The driver thus can distinguish between the main switch 3 and the approval switch 5 only by the touch with the finger, so as to reduce the probability of wrongly pressing the main switch 3 when the driver intends to operate the approval switch 5.

[Configuration of Drive Assistance System]

Figure 3:
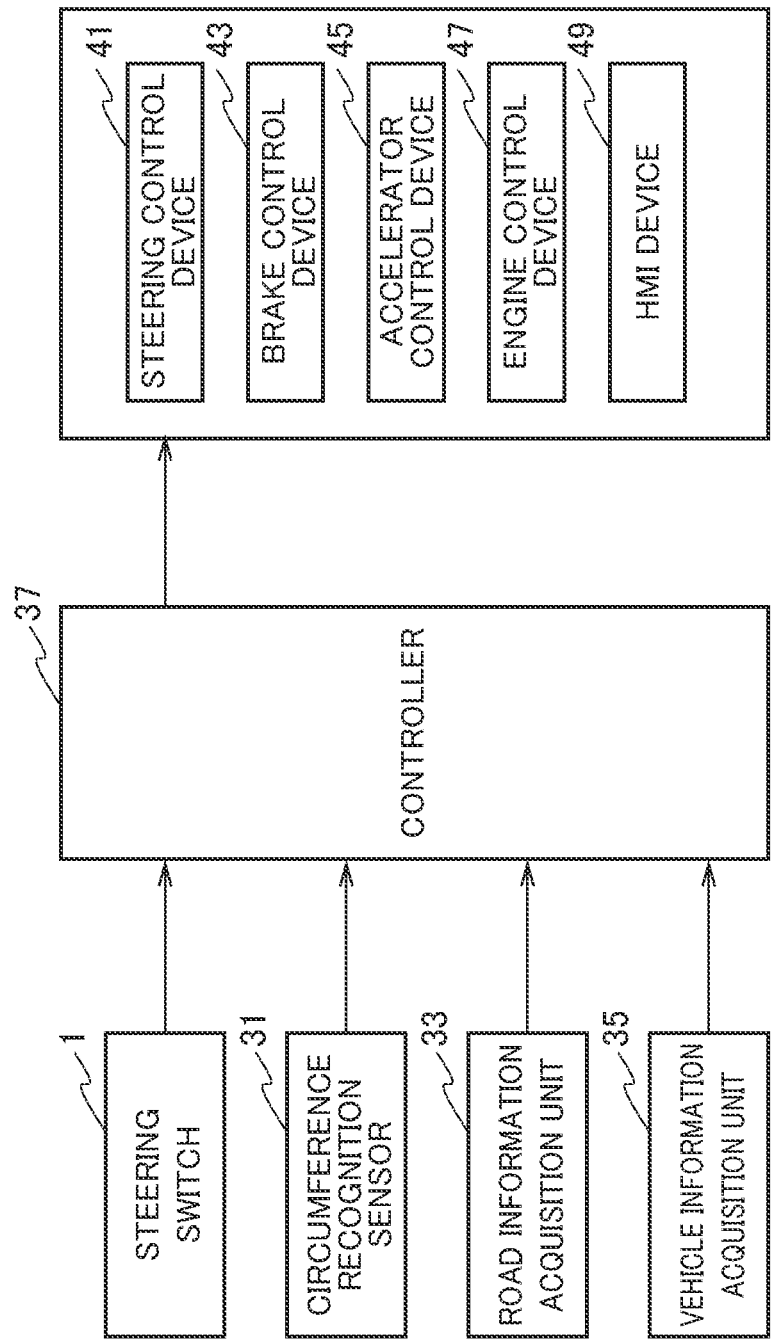
FIG. 3 is a block diagram illustrating a configuration of a drive assistance system of a vehicle equipped with the steering switches according to the embodiment of the present invention.

A configuration of the drive assistance system of the vehicle equipped with the steering switch 1 according to the present embodiment is described below with reference to FIG. 3. The drive assistance system includes the steering switch 1, a circumference recognition sensor 31, a road information acquisition unit 33, a vehicle information acquisition unit 35, and a controller 37, as illustrated in FIG. 3. The drive assistance system is connected to a steering control device 41, a brake control device 43, an accelerator control device 45, an engine control device 47, and a human machine interface (HMI) device 49 mounted on the vehicle.

The circumference recognition sensor 31 acquires circumference recognition information from a camera, radar, and a laser rangefinder, for example, and outputs the information to the controller 37. The circumference recognition information includes various kinds of information such as inter-vehicle distances from other vehicles around the host vehicle (including a parallel vehicle, an oncoming vehicle, a preceding vehicle, and a following vehicle), a relative velocity between the vehicles, positions of white lines, and obstacles.

The road information acquisition unit 33 acquires road information of the road on which the host vehicle is traveling, and outputs the information to the controller 37. In particular, the road information acquisition unit 33 acquires high-definition map information from a map database, or acquires information on traffic congestion via a communication network. The map information includes various kinds of information such as the number of lanes of roads, positions of junctions, and positions of traffic signals.

The vehicle information acquisition unit 35 acquires vehicle information of the host vehicle, and outputs the information to the controller 37. In particular, the vehicle information acquisition unit 35 is connected to various sensors such as an accelerator sensor, a steering sensor, a brake sensor, a velocity sensor, an acceleration sensor, and a wheel speed sensor of the host vehicle, and acquires sensed values from the group of the sensors.

The controller 37 is a control unit for executing the drive assistance for the host vehicle, and acquires the circumference recognition information, the road information, and the vehicle information so as to execute the drive assistance in accordance with the operation on the steering switch 1 by the driver. The controller 37 controls the steering control device 41, the brake control device 43, the accelerator control device 45, the engine control device 47, and the HMI device 49 mounted on the vehicle so as to execute the drive assistance.

The HMI device 49 provides notification to the driver of the vehicle with voice or indication via a speaker, the meter display, or the head-up display. For example, the HMI device 49 provides the notification with voice or indication when the drive assistance system requests the press of the approval switch 5 or when the approval switch 5 is pressed.

The controller 37 is composed of a general-purpose electronic circuit including a microcomputer, a microprocessor, and a CPU, and a peripheral device such as a memory. The controller 37 functions as a control unit for the drive assistance system when a specific program is executed. The respective functions of the controller 37 of this type can be implemented in single or plural processing circuits. The respective processing circuits include a programmed processing device, such as a processing device including an electric circuit, and also include an application-specific integrated circuit (ASIC) configured to execute the functions described in the present embodiment and a device such as a conventional circuit component.

[Lane-Change Control Processing]

Figure 4:
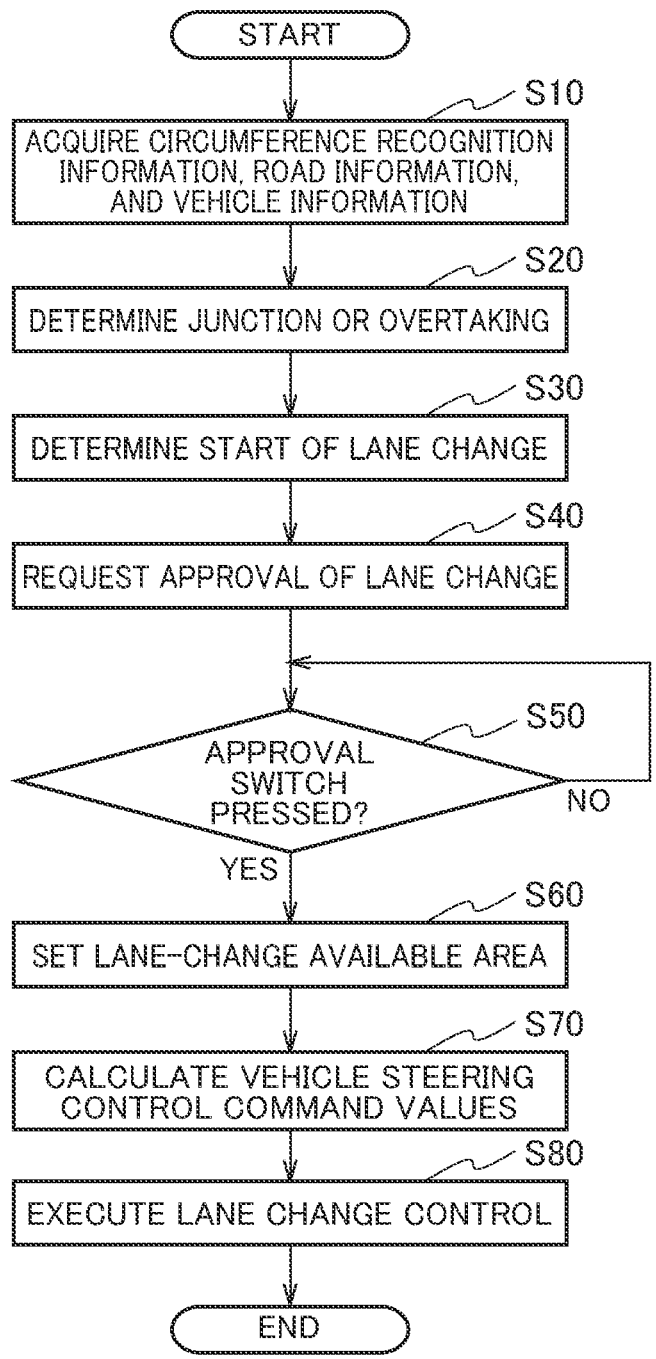
FIG. 4 is a flowchart showing a process of lane-change control processing executed by the drive assistance system of the vehicle equipped with the steering switches according to the embodiment of the present invention.

Next, lane-change control processing executed by the drive assistance system according to the present embodiment is described below with reference to FIG. 4. FIG. 4 is a flowchart showing a process of the lane-change control processing executed by the drive assistance system.

As shown in FIG. 4, in step S10, the controller 37 acquires the circumference recognition information from the circumference recognition sensor 31, acquires the road information from the road information acquisition unit 33, and acquires the vehicle information from the vehicle information acquisition unit 35.

Figure 5:
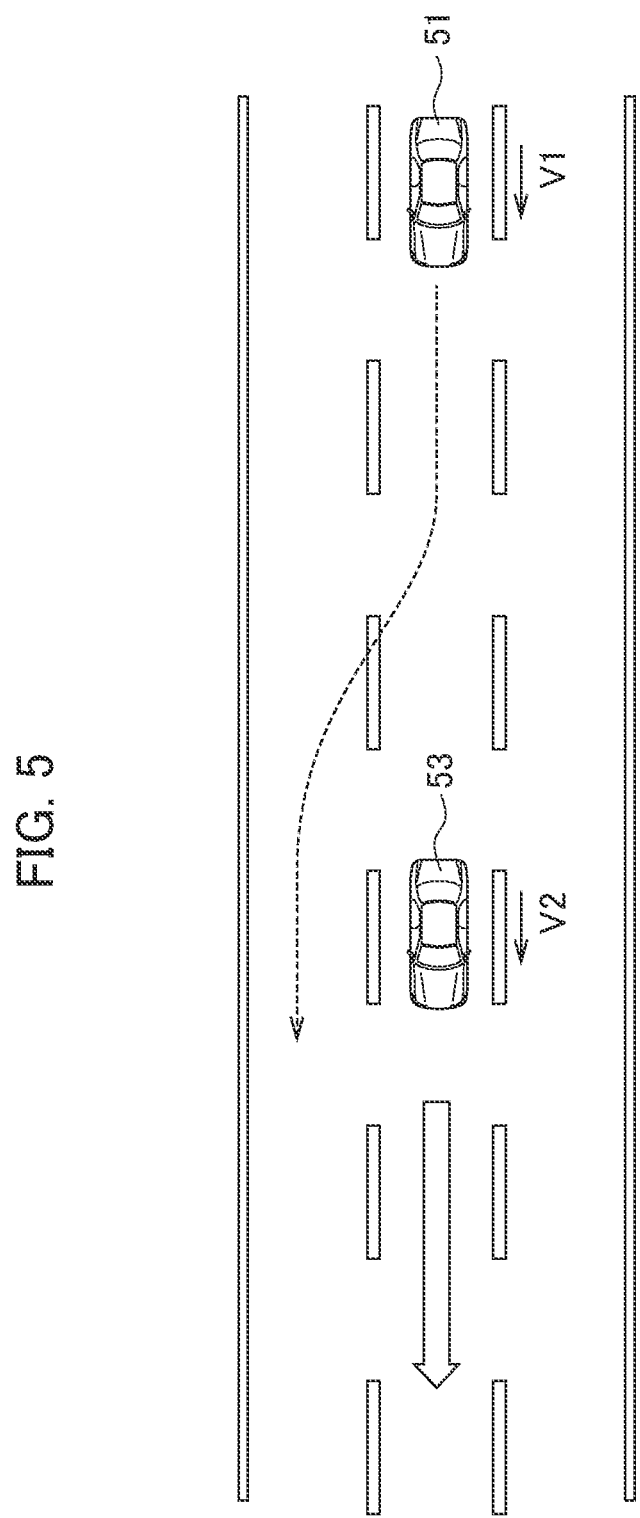
FIG. 5 is a diagram for explaining the lane-change control processing executed by the drive assistance system of the vehicle equipped with the steering switches according to the embodiment of the present invention.

In step S20, the controller 37 determines whether the host vehicle needs to overtake the preceding vehicle or whether the host vehicle is coming closer to a junction. The controller 37 acquires the position of the host vehicle, the positions of the white lines, and the relative velocity with respect to the preceding vehicle, for example, from the circumference recognition information, the road information, and the vehicle information. As illustrated in FIG. 5, when a velocity V1 of the host vehicle 51 is higher than a velocity V2 of the preceding vehicle 53 by a predetermined threshold or greater, the controller 37 determines that the host vehicle 51 needs to overtake the preceding vehicle 53. The controller 37 also acquires the position of the host vehicle and the position of the junction from the circumference recognition information and the road information, and determines that the host vehicle 51 is coming closer to the junction when a distance Da from the host vehicle 51 to the junction is a predetermined threshold or less, as illustrated in FIG. 6.

In step S30, the controller 37 makes a determination of whether to start a lane change. When the host vehicle 51 is determined to overtake the preceding vehicle 53, the controller 37 calculates a distance from the host vehicle 51 to the preceding vehicle 53, as illustrated in FIG. 5, and sets the timing of starting a lane change in view of the relative velocity. The controller 37 determines that the lane change is started at the set timing. The controller 37 determines the start of the lane change after confirming that there are no other vehicles in the lane next to the host vehicle 51.

Figure 6:
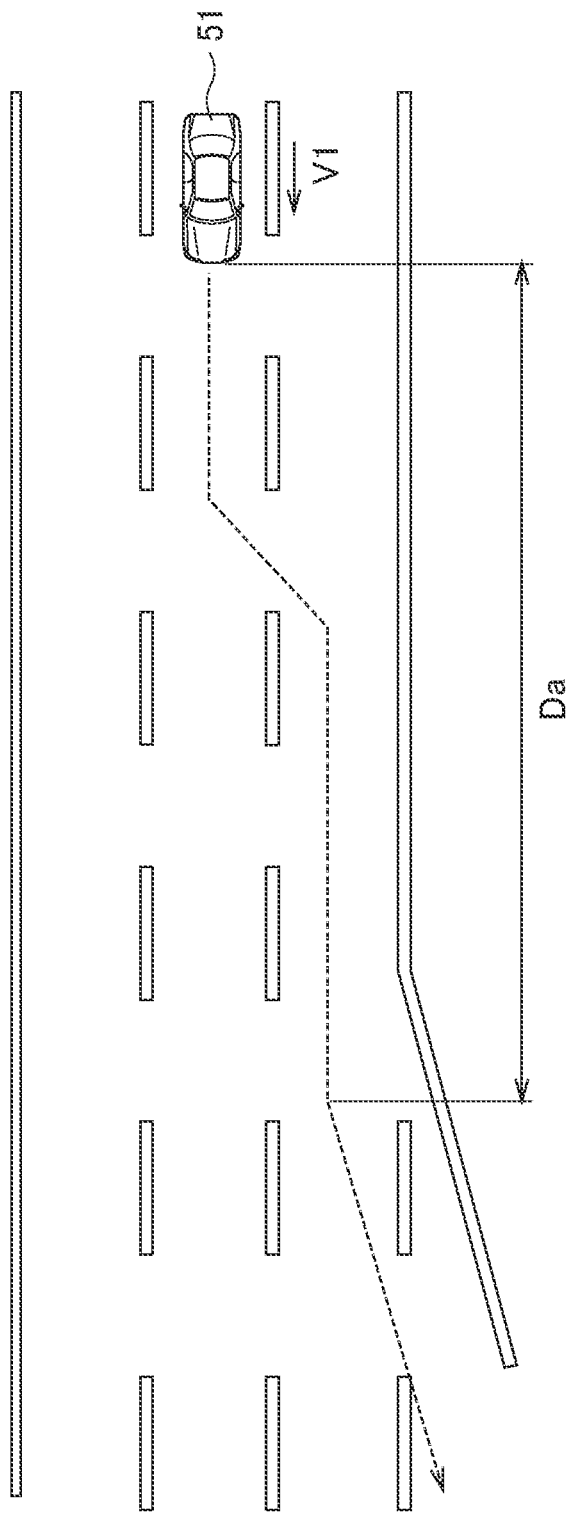
FIG. 6 is a diagram for explaining the lane-change control processing executed by the drive assistance system of the vehicle equipped with the steering switches according to the embodiment of the present invention.

When the host vehicle 51 is coming closer to the junction, the controller 37 calculates the distance Da from the host vehicle 51 to the junction, as illustrated in FIG. 6, and sets the timing of staring a lane change in view of the velocity V1 of the host vehicle. The controller 37 determines that the lane change is started at the set timing. The controller 37 determines the start of the lane change after confirming that there are no other vehicles in the lane closer to the junction next to the host vehicle 51.

In step S40, the controller 37 requests the driver of the vehicle to approve the lane change through the HMI device 49. In particular, the controller 37 provides the notification of requesting the driver to press the approval switch 5 with voice or indication through the head-up display or the speaker.

In step S50, the controller 37 determines whether the driver has pressed the approval switch 5, and the process proceeds to step S60 when the driver has pressed the approval switch 5. The controller 37 provides the notification to the driver by voice or indication when the approval switch 5 is pressed by the driver.

In step S60, the controller 37, when confirming the press of the approval switch 5, sets an area in which the host vehicle can make a lane change in the lane next to the host vehicle in accordance with the circumference recognition information.

In step S70, the controller 37 calculates control command values necessary for executing the lane change in accordance with the vehicle information. For example, the controller 37 calculates a steering angle and an accelerator opening angle as the control command values.

In step S80, the controller 37 outputs the calculated control command values to the steering control device 41 and the accelerator control device 45, and executes the lane change control. The lane-change control processing ends when the lane change of the host vehicle is executed.

[Effects of Embodiment]

As described above, the steering switch 1 according to the present embodiment includes the main switch 3 pressed to input the ON/OFF operation of the drive assistance system installed in the vehicle, and the approval switch 5 pressed to input the approval of a lane change executed by the drive assistance system. The approval switch 5 is arranged adjacent to the upper side of the main switch 3. As a result, when the driver operates the steering switch 1 with the thumb, the approval switch 5 can be arranged at the position closest to the thumb of the driver. Therefore, this arrangement can reduce the probability of wrongly pressing the main switch 3 when the driver intends to operate the approval switch 5 in response to the approval request from the drive assistance system.

In the steering switch 1 according to the present embodiment, the main switch 3 and the approval switch 5 are each arranged at the position closest to the rim 106. Since the main switch 3 and the approval switch 5 can be arranged closest to the position at which the driver holds the rim 106, the driver can operate the main switch 3 and the approval switch 5 most easily.

In the steering switch 1 according to the present embodiment, the main switch 3 has the wider switch surface than the approval switch 5. The driver thus can distinguish between the main switch 3 and the approval switch 5 only by the touch with the finger, so as to reduce the probability of wrongly pressing the main switch 3 when the driver intends to operate the approval switch 5.

In the steering switch 1 according to the present embodiment, the main switch 3 has the structure in which the lower region of the switch surface can be pressed, and the approval switch 5 has the structure in which the entire switch surface can be pressed. Since the press of the upper region of the main switch 3 adjacent to the approval switch 5 cannot be pressed, the probability of wrongly pressing the main switch 3 can be reduced when the driver intends to operate the approval switch 5.

In the steering switch 1 according to the present embodiment, the main switch 3 and the approval switch 5 are divided by the protruding member interposed therebetween. Since the protruding member allows the driver to recognize the boundary between the main switch 3 and the approval switch 5 with the finger, the probability of wrongly pressing the main switch 3 can be reduced when the driver intends to operate the approval switch 5.

In the steering switch 1 according to the present embodiment, the main switch 3 and the approval switch 5 are each arranged within a range corresponding to an average length of thumbs of adult drivers from the rim 106. This arrangement allows the driver to operate the main switch 3 and the approval switch 5 only by moving the thumb without releasing the hand from the rim 106.

In the steering switch 1 according to the present embodiment, the switch surfaces of the main switch 3 and the approval switch 5 are provided with the marks indicative of the functions executed upon the operation of the respective switches. Since the driver can easily recognize the functions of the respective switches, the probability of operating a wrong switch can be reduced.

In the steering switch 1 according to the present embodiment, the notification is provided to the driver of the vehicle with voice or indication when the drive assistance system requests the press of the approval switch 5 and when the approval switch 5 is pressed. The notification enables the driver to accurately recognize the timing of operating the approval switch 5 and also accurately confirm the completion of the operation of the approval switch 5.

In the steering switch 1 according to the present embodiment, the cancellation of the lane change executed by the drive assistance system is input when the approval switch 5 is pressed for a predetermined period or longer. The driver thus can immediately cancel the lane change by pressing again the approval switch 5 after pressing the approval switch 5 when wrongly approving the lane change.

The embodiment described above is an example of the present invention. It should be understood that the present invention is not intended to be limited to the embodiment described above, and various modifications including other embodiments can be made depending on the design without departing from the technical scope of the present invention.

REFERENCE SIGNS LIST

1 STEERING SWITCH
3 MAIN SWITCH
5 APPROVAL SWITCH
7 CANCELLATION SWITCH
9 INTER-VEHICLE DISTANCE SETTING CHANGE SWITCH
11 SCREEN CHANGE SWITCH
13 PROTRUDING MEMBER
31 CIRCUMFERENCE RECOGNITION SENSOR
33 ROAD INFORMATION ACQUISITION UNIT
35 VEHICLE INFORMATION ACQUISITION UNIT
37 CONTROLLER
41 STEERING CONTROL DEVICE
43 BRAKE CONTROL DEVICE
45 ACCELERATOR CONTROL DEVICE
47 ENGINE CONTROL DEVICE
49 HMI DEVICE
100 STEERING WHEEL
102 SPOKE
104 HUB
106 RIM
108 SUPPORT REGION

The invention claimed is:

1. A steering switch provided on a spoke of a steering wheel for steering a vehicle, the steering switch comprising:
a main switch pressed to input an ON/OFF operation of a drive assistance system installed in the vehicle; and
an approval switch pressed to input an approval of a lane change executed by the drive assistance system,
the approval switch being arranged adjacent to an upper side of the main switch.

2. The steering switch according to claim 1, wherein the main switch and the approval switch are each arranged at a position closest to a rim of the steering wheel.

3. The steering switch according to claim 1, wherein the main switch has a wider switch surface than the approval switch.

4. The steering switch according to claim 1, wherein the main switch has a structure in which a lower region of the switch surface can be pressed, and the approval switch has a structure in which the entire switch surface can be pressed.

5. The steering switch according to claim 1, wherein the main switch and the approval switch are divided by a protruding member interposed therebetween.

6. The steering switch according to claim 1, wherein the main switch and the approval switch are each arranged within a range corresponding to an average length of thumbs of adult drivers from a rim of the steering wheel.

7. The steering switch according to claim 1, wherein the switch surfaces of the main switch and the approval switch are each provided with a mark indicative of a function executed upon an operation of the respective switches.

8. The steering switch according to claim 1, wherein a notification is provided to a driver of the vehicle with voice or indication when the drive assistance system requests a press of the approval switch and when the approval switch is pressed.

9. The steering switch according to claim 1, wherein a cancellation of the lane change executed by the drive assistance system is input when the approval switch is pressed for a predetermined period or longer.

* * * * *